US009613522B2

(12) United States Patent
Doyle

(10) Patent No.: US 9,613,522 B2
(45) Date of Patent: Apr. 4, 2017

(54) SECURITY SYSTEM

(75) Inventor: Alan T. Doyle, Brookfield, WI (US)

(73) Assignee: Kelly Research Corp., Brookfield, WI (US)

( * ) Notice: Subject to any disclaimer, the term of this patent is extended or adjusted under 35 U.S.C. 154(b) by 956 days.

(21) Appl. No.: 13/536,454

(22) Filed: Jun. 28, 2012

(65) Prior Publication Data

US 2013/0003318 A1 Jan. 3, 2013

Related U.S. Application Data

(60) Provisional application No. 61/502,658, filed on Jun. 29, 2011.

(51) Int. Cl.
*B60R 25/00* (2013.01)
*G08B 25/14* (2006.01)
*G08B 13/12* (2006.01)

(52) U.S. Cl.
CPC ............ *G08B 25/14* (2013.01); *G08B 13/128* (2013.01)

(58) Field of Classification Search
None
See application file for complete search history.

(56) References Cited

U.S. PATENT DOCUMENTS 2,709,249 A 5/1955 Sperry
5,854,831 A * 12/1998 Parsadayan .......... H04M 11/025 379/102.06
2002/0183882 A1 12/2002 Dearing et al.
2003/0071715 A1* 4/2003 Lavelle .............. G07C 9/00103 340/5.5
2003/0095385 A1* 5/2003 Holliday ................ H04N 7/106 361/728
2006/0103520 A1 5/2006 Clark
2008/0071426 A1 3/2008 Perez et al.
2008/0256445 A1 10/2008 Olch et al.
2009/0058641 A1* 3/2009 DeMarco ...................... 340/540
2009/0231091 A1* 9/2009 Burwell et al. ................ 340/5.2
2010/0032332 A1 2/2010 Davis et al.
(Continued)

OTHER PUBLICATIONS

European Appln. No, 12803902.1, Supplementary European Search Report dated Feb. 9, 2015, 7 pages.

*Primary Examiner* — Curtis King
(74) *Attorney, Agent, or Firm* — Boyle Fredrickson, S.C.

(57) ABSTRACT

A security system includes a central control and a number of security controllers, each of which includes a removable and replaceable security control module. Each module is interchangeable with other modules. Each controller includes a housing within which the module is contained. Cables from security-controlled components extend into the interior of the housing and are removably connected to the module. Each module includes a first connector for connection in a communication system and a second connector for receiving inputs from and providing outputs to a security component controlled by the controller. Each module further includes a third connector for receiving inputs from or providing outputs to an auxiliary device other than the security component. The auxiliary device provides an input to the controller or receives an output from a controller independent of the security component. Each controller also includes an accelerometer for providing a tamper evident feature.

14 Claims, 10 Drawing Sheets

(56) References Cited

U.S. PATENT DOCUMENTS

2010/0237984 A1* 9/2010 Zenaty ............... G07C 9/00158 340/5.2
2011/0167268 A1* 7/2011 Baykal .................... H04L 63/08 713/169
2013/0120138 A1* 5/2013 Hicks, III ..................... 340/538

* cited by examiner

SECURITY SYSTEM

CROSS REFERENCE TO RELATED APPLICATION

This application claims the benefit of U.S. Provisional Application No. 61/502,658.

BACKGROUND AND SUMMARY

This invention relates to a security system, and more particularly to a security system having a number of unique features.

Various security systems, such as access control systems, are known in the art. Typically, an access control security system includes a controller at each access point, such as a door or gate, which interfaces with the access point to selectively allow or deny access to a certain area that is accessible through the access point. The controller is typically hardwired in a network run by a server, and acts in accordance with commands provided by the server to allow or deny requests for access through the access point.

While systems such as this are functional, they entail a number of drawbacks. For example, when the controller at a certain access point fails or otherwise becomes inoperable, it is necessary to send a skilled service technician with a replacement controller to the site at which the access point controller requires replacement. The technician must disconnect wires and cables from the failed controller, remove it from the wall, mount the new controller to the wall, and then connect the wires and cables to the new controller. This can be a laborious and time consuming exercise. In addition, the operator of the facility must maintain an inventory of each type of controller installed in the system to ensure that a replacement controller is available when required.

The present invention is designed to overcome these and other drawbacks in the prior art. In accordance with one aspect of the present invention, a security system includes a number of security controllers, each of which includes a removable and replaceable security control module. Each security control module is interchangeable with other security control modules in the security system. In one form, each security controller includes a housing within which the removable and replaceable security control module is contained. Representatively, the housing is mounted to a wall, and one or more cables from security-controlled components are located within the wall and have ends that extend from the wall into an interior defined by the housing. The ends of the one or more cables are adapted for connection to the security control module. Each security control module may include a first connector for connecting the security module in a communication system and a second connector for receiving inputs from and providing outputs to a security component controlled by the security controller. Representatively, each security control module may further include a third connector for receiving inputs from or providing outputs to an auxiliary device other than the security component.

In accordance with another aspect of the present invention, a security system includes a central control or server and a number of individual security controllers, each of which is associated with a security component at an individual security control location; and an auxiliary device that is interconnected with at least one of the security controllers. The auxiliary device provides an input to the security controller or receives an output from a security controller independent of the security component. Each security controller includes a removable and replaceable security control module, and each security control module includes a first connector for connecting the security module in a communication system interconnected with the central control or server, a second connector for receiving inputs from and providing outputs to the security component controlled by the security controller, and a third connector for receiving inputs from or providing outputs to the auxiliary device.

In accordance with yet another aspect of the invention, a security system includes a number of security controllers, each of which includes an accelerometer for providing a tamper evident feature. Representatively, each security controller includes a housing and a removable and replaceable security control module contained within the housing, with the accelerometer being contained within the security control module.

The security system in accordance with the present invention may be used in any number of applications. For example, the security system may be used for a number of individual control points in a single building. Alternatively, the security system may be used for multiple individual control points for a number of buildings in one location. Further, the security system may be used for multiple individual control points in multiple buildings in multiple locations.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications

BRIEF DESCRIPTION OF THE DRAWINGS

A representative embodiment of the subject matter disclosed herein is illustrated in the accompanying drawings in which like reference numerals represent like parts throughout, and in which.

Figure 1:
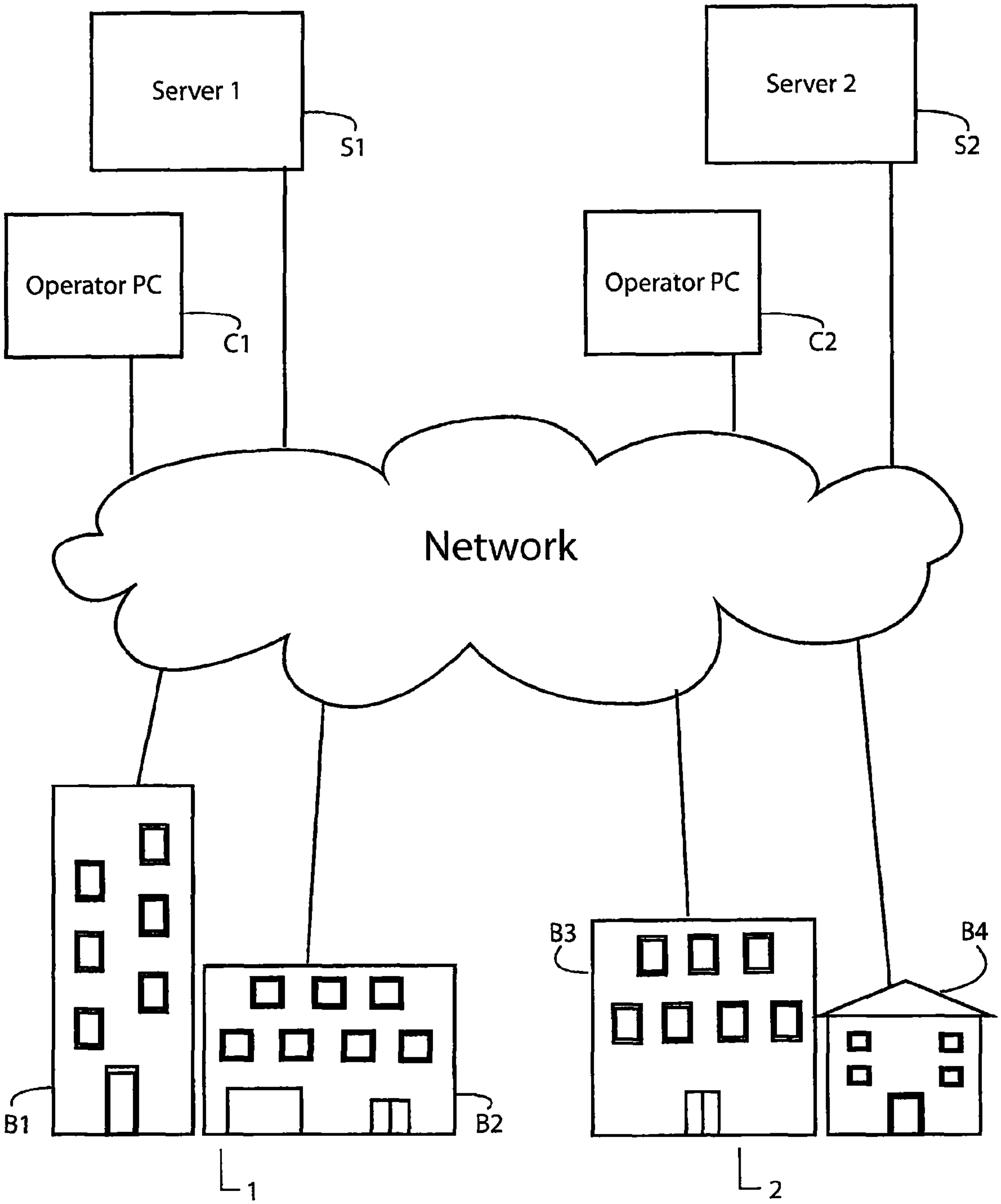
FIG. 1 is a schematic representation of a multiple building application of a security system incorporating the control arrangement of the present invention.

In describing the representative embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

A representative application of the security system in accordance with the present invention is shown in FIG. 1. In this application, the security system utilizes multiple servers for multiple buildings in multiple locations. It is understood, however, that the following description applies equally to applications involving a number of individual control points in a single building or multiple individual control points in a number of buildings in one location. In the illustrated application, the security system includes a pair of servers S1 and S2. The system may be operated using a single server, but multiple servers are desirable in case one of the servers becomes inoperable. Servers S1 and S2 may be physically located at respective locations L1 and L2, although it is understood that the servers S1 and S2 may also be at locations remote from locations L1 and L2. The security system further includes a pair of operator controls C1 and C2. Again, the system may be operated using a single operator control, but multiple operator controls are desirable in case one of the operator controls becomes inoperable. Operator controls C1 and C2 may be physically located at respective locations L1 and L2, although it is understood that the operator controls C1 and C2 may also be at locations remote from locations L1 and L2. Locations L1 and L2 may have multiple buildings or other security controlled structures, such as shown at B1, B2 and B3, B4, respectively.

In a representative application as shown, the servers S1, S2 and operator controls C1, C2 communicate with the security control structures through a computer network, which representatively may be the Internet. The locations L1 and L2 may be on the same grounds, or alternatively may be within the same city or region, or may be geographically far removed from each other, such as in different cities or even on different continents.

Figure 2:
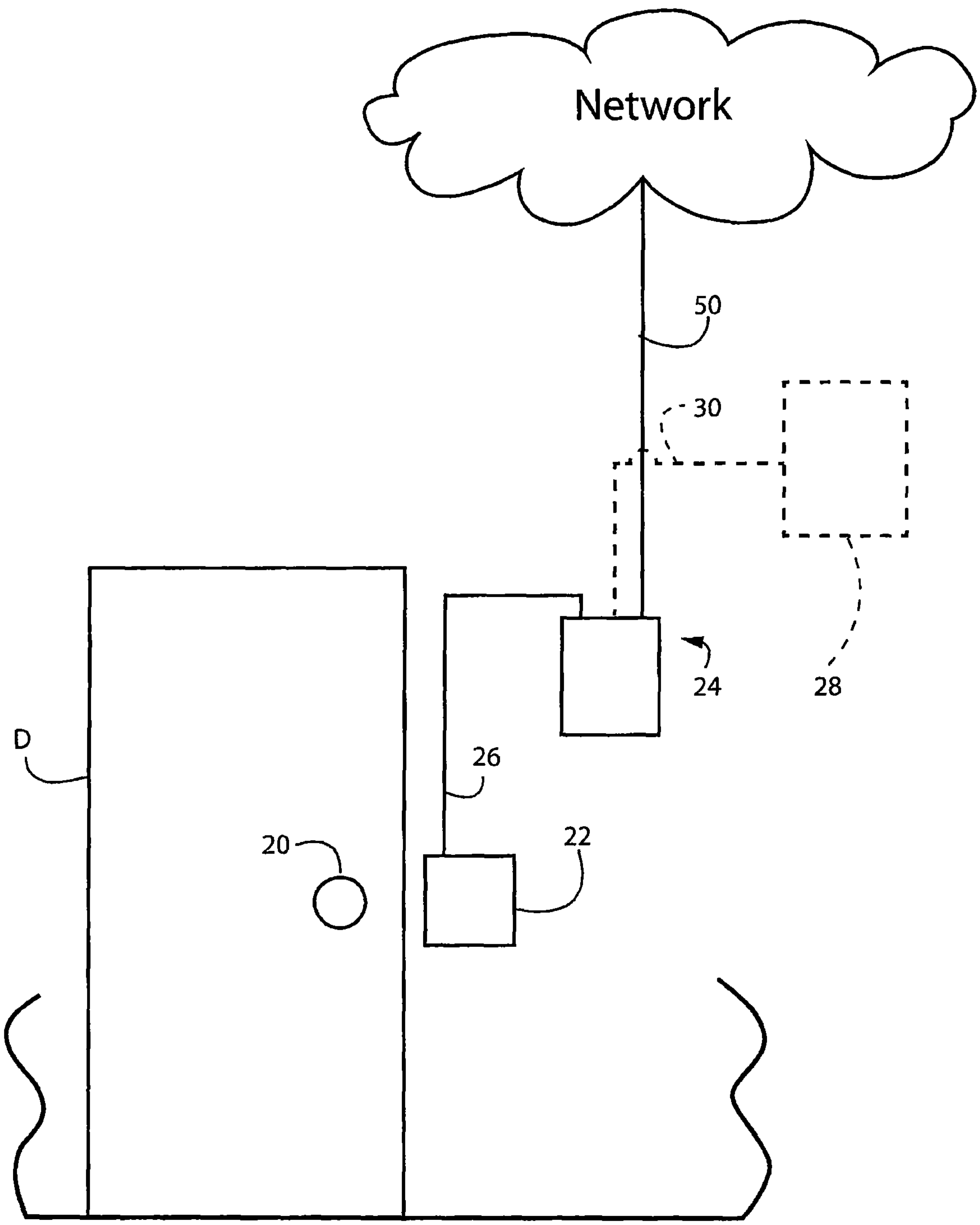
FIG. 2 is a schematic representation of a component, such as a door, which is interconnected in the security system of a building, such as in FIG. 1, and which is controlled using the control arrangement of the present invention.

Within each security control structure, such as within each building B1, B2, B3 and B4, there are one or more access control points which can operate individually and/or simultaneously. FIG. 2 illustrates an access control point in the form of a door D. It is understood, however, that the individual access control point may be any other security or access control device, such as a garage door, gate, etc. Referring to the illustrated embodiment, the door D has a handle, which may be in the form of a doorknob 20 or a push bar. A selectively releasable door access controller 22 of conventional construction, such as a door lock or latch, is located adjacent the door D, and is typically mounted to or within the wall in which door D is located. A security controller 24 in accordance with the present invention, which may also be referred to as a security node, is located in the vicinity of the door D. Typically, the security controller 24 will be mounted to or within the wall in which door D is located, although it is understood that security controller 24 may be any other satisfactory location. Security controller 24 is connected to the door access controller 22 via a cable, such as one of cables 26*a*, 26*b*. In a manner to be explained, security controller 24 may optionally be interconnected with one or more auxiliary devices 28 via a cable, such as one of cables 30*a*, 30*b*. The auxiliary device 28 will typically be in the vicinity of the security controller 24 so that cable 30*a*, 30*b* can be satisfactorily routed between security controller 24 and auxiliary device 28, although it is understood that auxiliary device 28 may be in any other satisfactory location.

Figure 3:
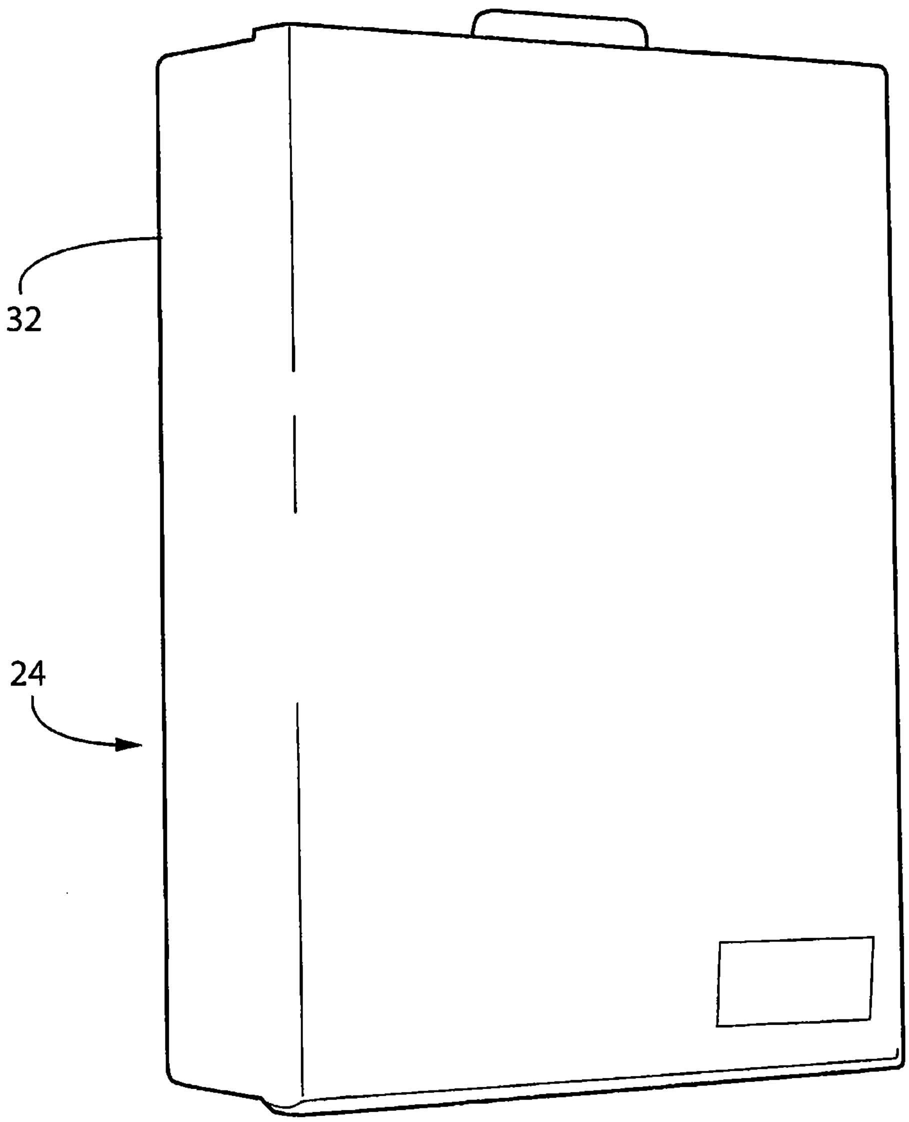
FIG. 3 is an isometric view of a security controller incorporated in the control arrangement of the present invention such as in FIG. 2.
Figure 4:
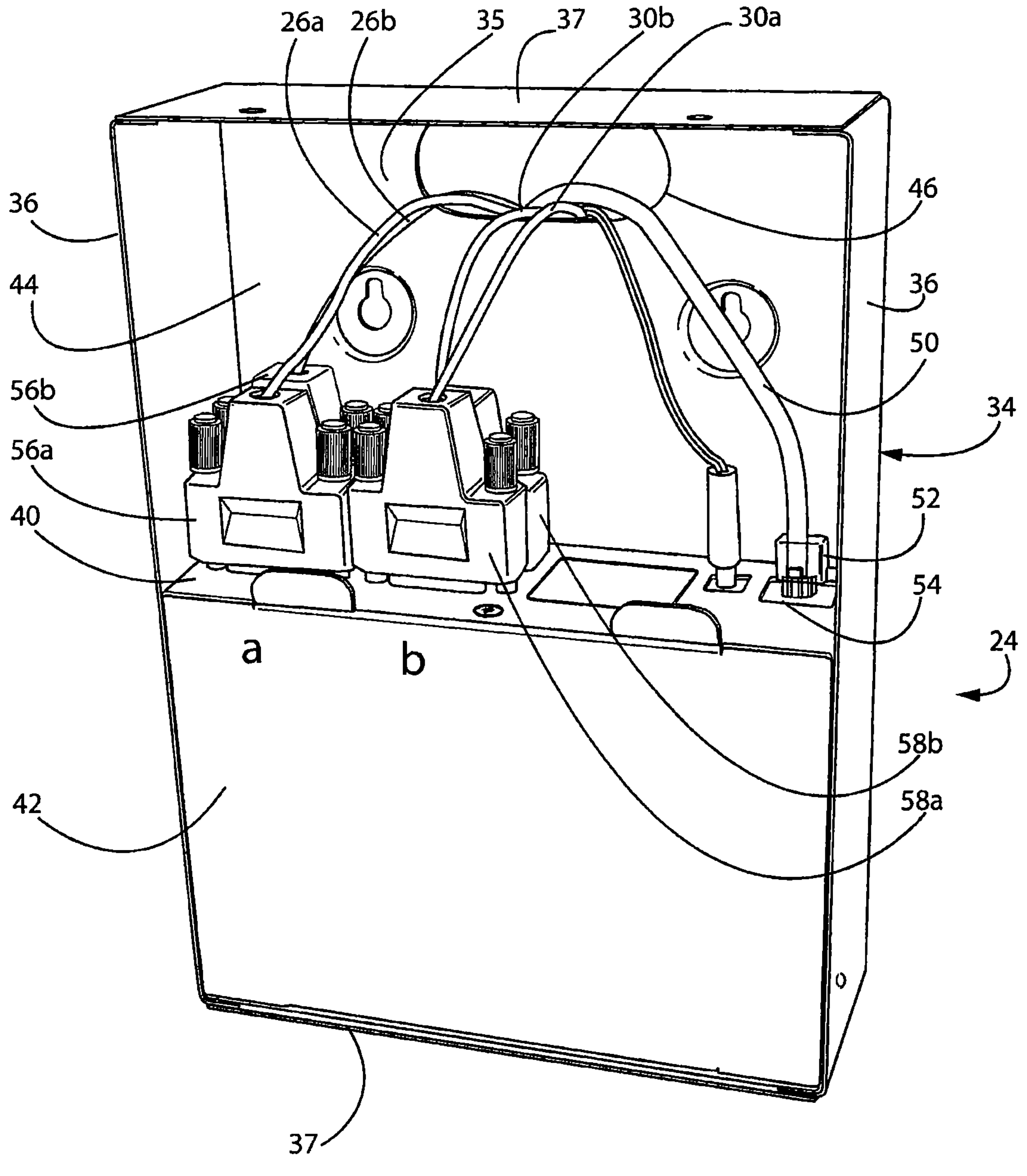
FIG. 4 is a an isometric view of the security controller of FIG. 3, showing the cover of the security controller housing removed to expose the control module contained within the interior of the housing, and showing various cables interconnected with the control module.

FIG. 3 illustrates a representative installation of security controller 24 adjacent the door D, in which security controller 24 is mounted to the wall adjacent door D. Security controller 24 includes a cover 32, which prevents access to the internal components of security controller 24. Cover 32 may or may not be fitted with a lock so that it can only be removed by authorized personnel. Cover 32 is configured for engagement with a housing 34 which, as shown in FIG. 4 with cover 32 removed, is adapted to be mounted to the wall in either a flush mount or surface mount manner. Housing 34 may be secured to the wall using any satisfactory mounting method, such as by a series of fasteners that extend through openings in a wall of the housing 34 into engagement with wall-mounted anchors. It is understood, however, that any other satisfactory mounting arrangement may be employed. It is also understood that housing 34 may be recessed into the wall rather than being surface-mounted to the wall. In the illustrated embodiment, housing 34 is shown as having a rectangular construction, including a back wall 35, a pair of side walls 36 and a pair of end walls 37. Housing 34 thus defines a recess bounded by back wall 35, side walls 36 and end walls 37. Again, it is understood that housing 34 may have any other configuration as desired.

Figure 5:
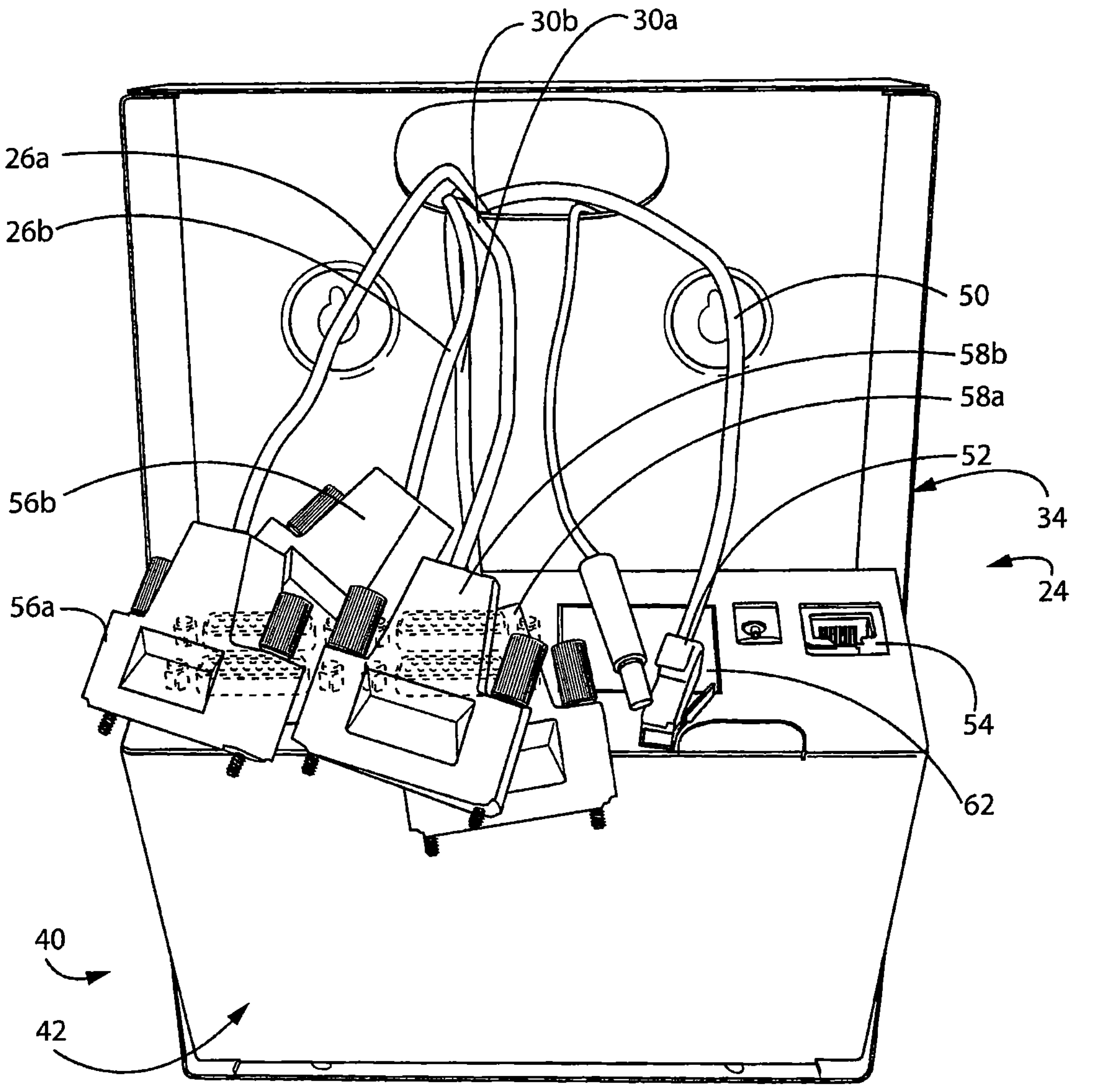
FIG. 5 is a view similar to FIG. 4, showing disconnection of the various cables from the control module, such as in anticipation of replacement of the control module.

As shown in FIGS. 4 and 5, security controller 24 includes a control module 40, which is removably secured to the housing 34. In the illustrated embodiment, the control module 40 is retained within the recess defined by the walls of housing 34 and is maintained in the interior of housing 34 by engagement of cover 32 with housing 34. In this embodiment, control module 40 includes a control module housing 42 that generally has a configuration matching a portion of the recess defined by the walls of housing 34. Control module housing 42 has a width slightly less than the spacing between the sidewalls 36 of housing 34 and a depth slightly less than the height of the housing sidewalls 36 and end walls 37. Control module housing 42 has a height significantly less than the length of the housing sidewalls, which therefore leaves an open space 44 above the control module housing 42. The back wall 35 of housing 34 has an opening in communication with the open space 44. In the illustrated embodiment, a grommet 46 is positioned in the opening in back wall 44. With this arrangement, cables 26*a*, 26*b* and 30*a*, 30*b* can be routed through the wall, and extend through an opening in the wall that is aligned with the opening in back wall 44 so as to enable the ends of cables 26*a*, 26*b* and 30*a*, 30*b* to be positioned within the open space 44. In addition, the end of a communication cable 50, which is also routed through the wall, extends through the opening in back wall 35 and into the open space 44. Cable 50 terminates in a connector 52, which is adapted for engagement with a communication port 54 on the control module 42. Similarly, cables 26*a*, 26*b* terminates in respective connectors 56*a*, 56*b* and cables 30*a*, 30*b* terminates in respective connectors 58*a*, 58*b*. Cable connectors 56*a*, 56*b* and 58*a*, 58*b* are configured for engagement with respective i/o connectors 60*a*, 60*b* and 62*a*, 62*b* on control module 40.

The construction of security controller 24 facilitates quick and easy installation, service, repair and/or replacement. Specifically, in the event the control module 40 of a security controller 24 requires service, repair or replacement, the user simply disengages connectors 52, 56*a*, 56*b*, 58*a* and 58*b* as shown in FIG. 5. Control module 42 can then be removed from the recess defined by housing 34. In the illustrated embodiment, housing 42 of control module 40 is constructed so that its bottom and wall rests on the bottom end wall 37 of housing 34 and the sidewalls of control module housing 42 have a friction fit with the sidewalls 36 of housing 34. It is understood, however, that any type of removable mounting arrangement may be employed. For example, and without limitation, a releasable snap-type latch or a fastener-type connection between control module housing 42 and housing 34, or between control module housing 42 and cover 32, may be employed. In addition, it is understood that the specific configuration of housing 34 and control module housing 42 is representative of any of a wide variety of housing and control module configurations that may be employed. One of the primary aspects of the present invention, however, is that the control module, regardless of its specific configuration, is contained within a housing and that the connections of the cables to the control module are also contained within the same housing, which enables quick and easy disconnection and removal of the control module 40 as well as quick and easy connection and installation of the control module 40.

Figure 6:
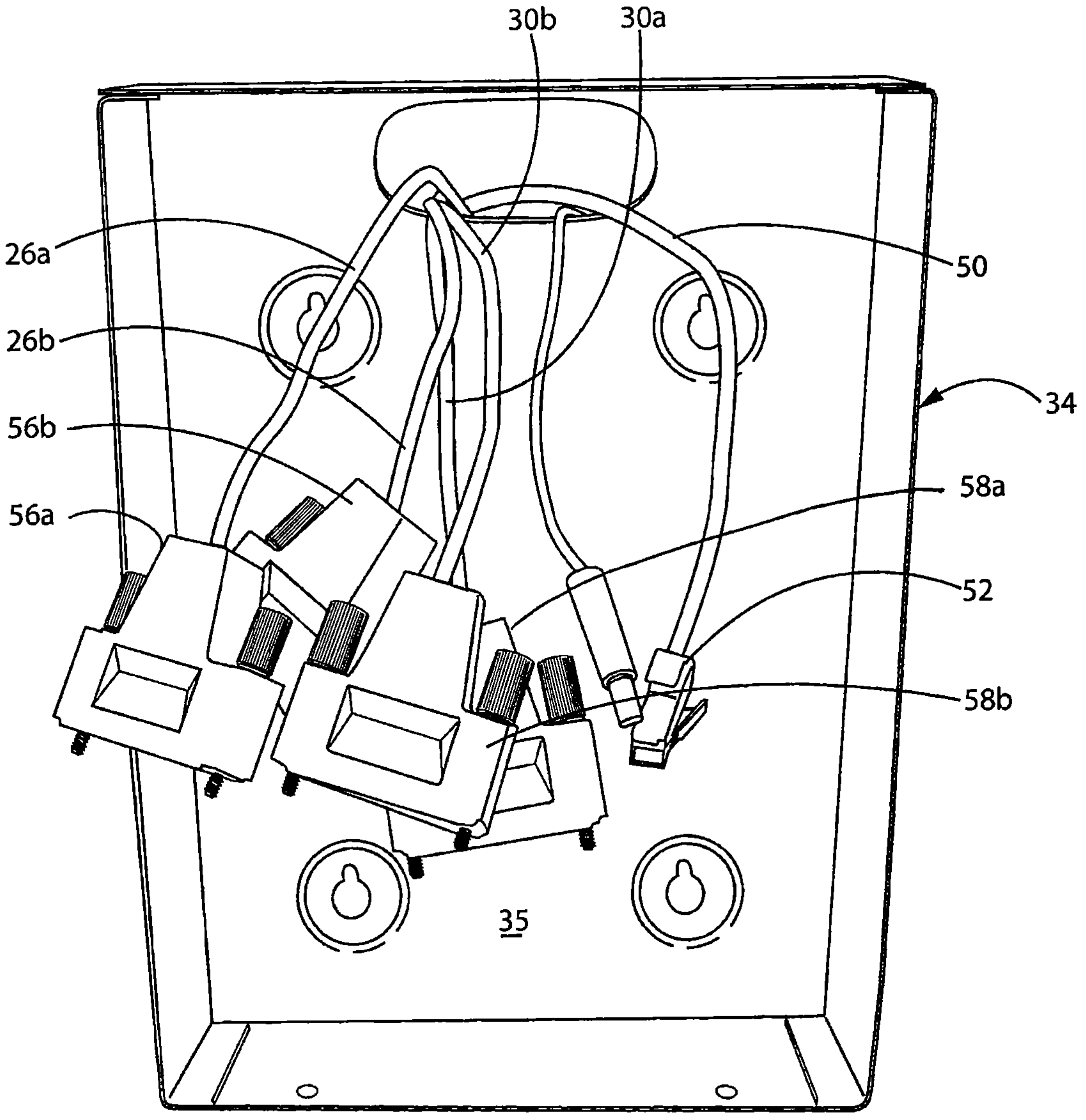
FIG. 6 is a view similar to FIGS. 4 and 5, showing the control module removed.
Figure 7:
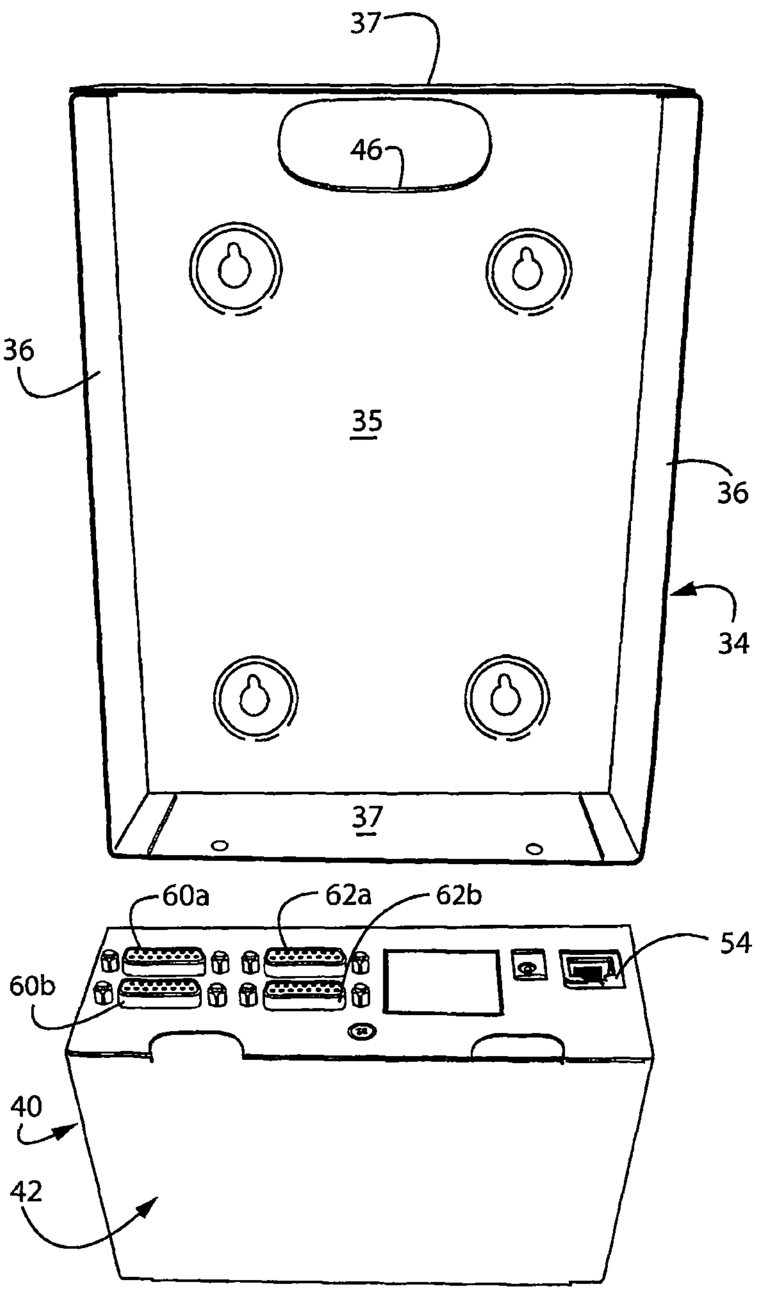
FIG. 7 is view similar to FIGS. 4-6, showing provision of a replacement control module.
Figure 8:
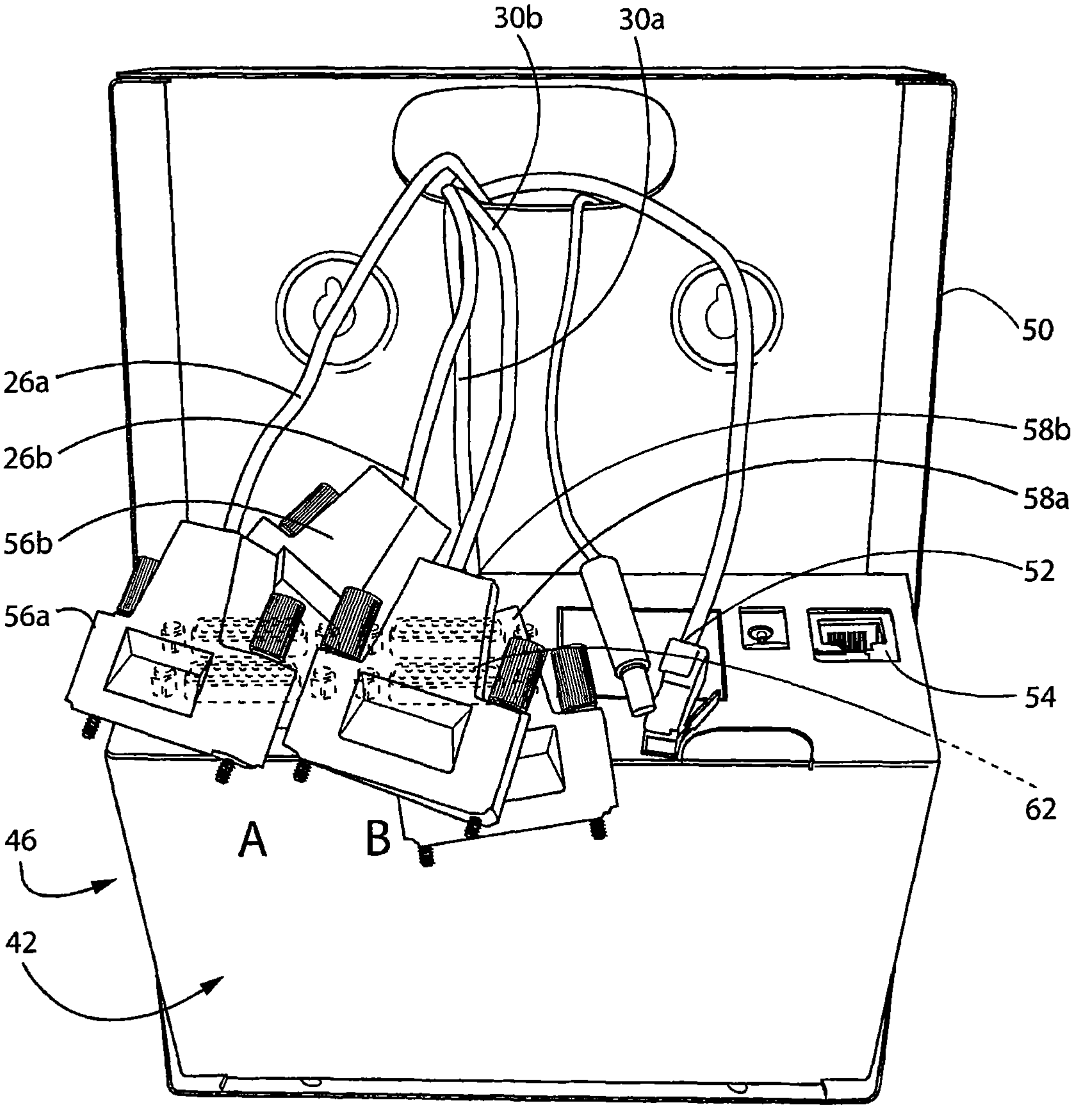
FIG. 8 is a view similar to FIGS. 4-7, showing the various cables positioned adjacent the replacement control module.
Figure 9:
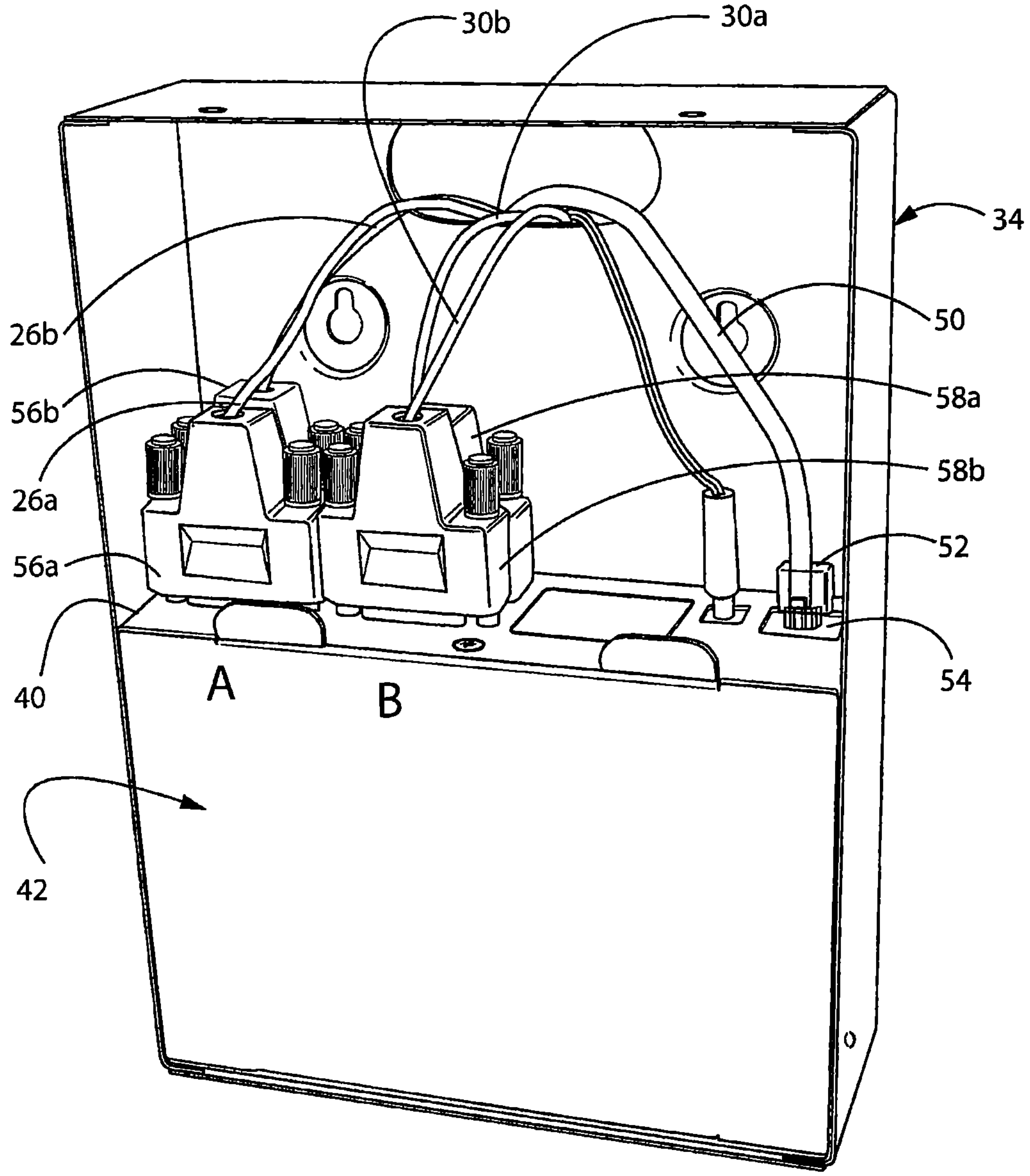
FIG. 9 is a view similar to FIGS. 4-8, showing connection of the various cables with the replacement control module.

FIG. 6 illustrates the housing 34 with the control module 40 removed. FIG. 7 shows the control module 42 and the housing 34 separated from each other, but clearly illustrates the connectors 54, 60*a*, 60*b* and 62*a*, 62*b* of the control module 40. To replace a control module 40 that has been removed from housing 34, a new control module 40 as in FIG. 7 is provided and is positioned within housing 34, as shown in FIG. 8. The cable connectors 52, 56*a*, 56*b* and 58*a*, 58*b* are then engaged with the respective control module connectors 54, 60*a*, 60*b* and 62*a*, 62*b* of the new control module 40, as shown in FIG. 9. The new control module 40 is then positioned within the interior of the housing 34 as shown in FIG. 4, and the cover 32 is engaged with the housing 34.

Communication cable 50 establishes communication between control module 40 and the network in which the security system of the present invention is connected. In this manner, control module 40 is able to receive signals from, and transmit signals to, the security system servers such as S1, S2 (FIG. 1). The cables 26*a*, 26*b* connect the control module 40 to the door access controller 22. The cables 30*a*, 30*b* connect the control module 40 to the auxiliary device 28. In this manner, control module 40 is able to receive signals from and transmit signals to the door access controller 22 and the auxiliary device 28.

While the overall construction of security controller 24 is unique in that control module 40 is adapted for quick and easy installation, removal and replacement, the operation of security controller 24 in connection with the access control point, such as door D, is relatively conventional. Security controller 24 functions to operate in conjunction with access controller 22 to selectively allow door D to be opened by or for authorized users.

Auxiliary i/o connectors 62*a*, 62*b* enable control module 40 to receive signals from and communicate signals to one or more auxiliary devices. The types of auxiliary devices that can be connected to control module 40 via connectors 62*a*, 62*b* are virtually unlimited and can be operated individually and/or simultaneously. In this manner, a wide variety of functions and operations can be integrated with the security system of a building. For example, auxiliary device 28 may be a sensor associated with a machine or piece of equipment located within a room. In the event the sensor determines that operating characteristics of the machine or piece of equipment are not within acceptable limits, control module 40 can send a signal through communication cable 50 that is processed by one of the servers. Appropriate personnel can then be alerted or the machine or piece of equipment can be shut down. In another example, auxiliary device 28 may be an elevator controller. In an arrangement such as this, when a person with certain credentials is detected at the door D, such as by use of a card reader or other identifier as is known, the access controller 22 is operated and at the same time a signal is sent to the elevator to bring the elevator cab to a certain location. In another example, the auxiliary device 28 may be a garage door opener so that a garage door is automatically opened when a certain person is allowed to pass through the door D. Another example may involve automatic operation of a security camera or the like in response to an input to or output from an access point controller 22. The device 28 may alternatively be a temperature sensor, so that the temperature of a sensed condition or parameter, such as room temperature, machine operating temperature, etc. can be monitored for compliance with established parameters or ranges. User-defined commands can be sent directly to any IP device in the system in response to an event.

This aspect of the present invention provides numerous advantages, in that signals to and from virtually any machine, equipment or device can be provided to and from the security system controller 24, and therefore can be integrated or coordinated with the various components of the security system. Accordingly, an event at any particular location or node in the security system may be used to trigger another event or operation at any other location, either locally or at a remote location. It is understood, however, that the signals provided to the security system controller 24 from the auxiliary machine, equipment or device need not necessarily be integrated or coordinated with the security system components, and instead the security system network may simply be used to transmit or receive signals to and from the auxiliary machine, equipment or device.

The circuitry contained within control module 40 allows any control module 40 to be used with a security controller 24 at any location, and for any purpose, within the security system. In this manner, when necessary, a user can simply swap out one control module 40 for another control module 40, and the replacement control module 40 can then perform all the operations and functions of the original control module 40.

Figure 10:
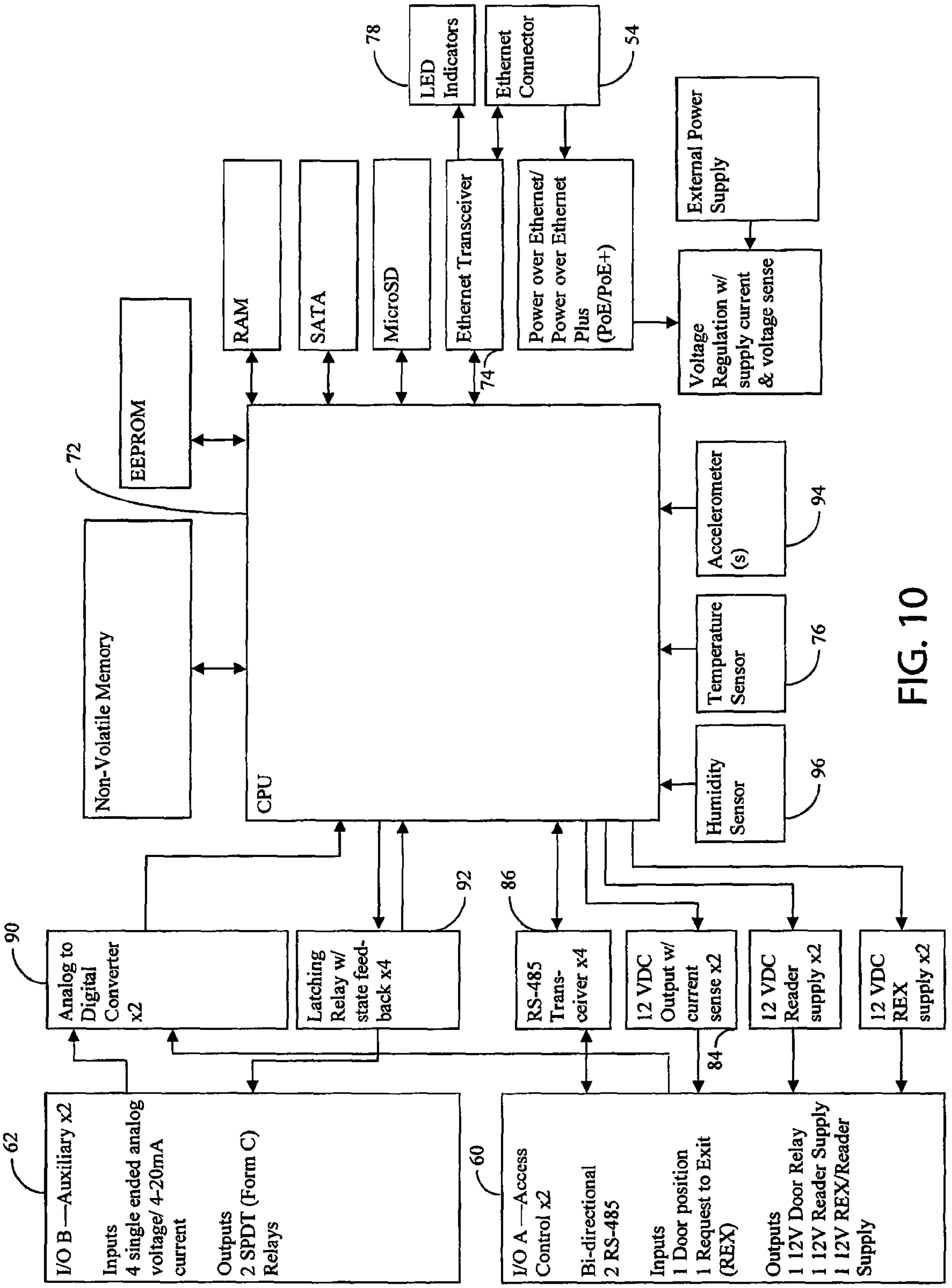
FIG. 10 is a block diagram illustrating the components incorporated into the control module illustrated in FIGS. 4-9.

FIG. 10 illustrates a block diagram of the circuitry contained within the control module 40. As shown, the control module 40 includes a CPU 72, which in turn is interconnected with an Ethernet driver 74 that includes communication connector 54. A humidity sensor 96 and a temperature sensor 76 are connected with CPU 72, and LED indicators 78 may also be interconnected with Ethernet driver 74. In an application in which control module 40 is used to control door access, such as shown in FIG. 2, the access control i/o connector 60 is interconnected with CPU 72 through a power output 84 and a RS-485 transceiver 86. Inputs to CPU 72 through the i/o connectors 60*a*, 60*b* from cables 26*a*, 26*b* may include, for example, card reader inputs, door position inputs, and request-to-exit inputs. Outputs from CPU 72 through i/o connectors 60*a*, 60*b* may include a door relay power output, a card reader power supply output, and a request-to-exit power supply. Auxiliary i/o connectors 62*a*, 62*b* include both analog and digital connections. Signals from the analog and digital connections of auxiliary i/o connectors 62*a*, 62*b* are applied to the CPU 72 through an A/D converter 90 and latching relays 92. In addition, an accelerometer 94 is interconnected with the CPU 72.

The i/o connectors 60*a*, 60*b* and 62*a*, 62*b* have both analog input as well as digital input and output capabilities. This enables the control module 40 to receive and transmit digital signals and to receive analog signals from the devices with which the connectors 60*a*, 60*b* and 62*a*, 62*b* are connected. The control module 40 may also receive digital signals from devices with which the connectors 60*a*, 60*b* and 62*a*, 62*b* are connected.

Accelerometer 94 provides an input signal when control module 40 is moved. The input signal from accelerometer 94 is used as a tamper-indicating feature. For example, in connection with an operating and installed control module 40, any movement of the control module 40 that is sensed by operation of accelerometer 94 may be communicated to the security system control. Appropriate action can then be taken.

Control module 40 will be configured upon installation. In this regard, when a control module 40 is installed initially or as a replacement in a security controller 24 and is connected to the network via engagement of cable 50, the installed control module 40 is programmed to immediately broadcast a signal over the network that indicates its presence within the network. The server, which has stored the settings and the parameters for all of the security controllers 24 in the security system, can then communicate with the installed control module 40 so as to provide the installed control module 40 with the appropriate settings and parameters for that security control point. Alternatively, when a new security controller 24 is being installed in the security system, such as when a new security control point is added due to facility expansion, remodeling or the like, the new security controller 24 includes a new control module 40. When the new control module 40 is connected in the security system, it immediately broadcasts a signal over the network that indicates its presence within the network. The server then detects the new security module 40, and the operator can then configure the settings of the new security module 40 for the security control point at which the new security module 40 is installed. Alternatively, the settings for the new control module 40 can be programmed into the control module 40 at the site of the new security controller 24.

In the event the system server(s), such as S1 and S2, become inoperable for any reason, the individual security controllers 24 in the system continue to operate locally according to the security settings programmed into the control module 40. When the server(s) are back on line, data stored locally by the control module 40 for the period of server inoperability is uploaded to the server(s). In addition, the security controllers 24 in the security system are able to communicate with each other through the network without the presence of a server. This feature enables operation of the security system and cross-control of various functions in the event the system server(s) become inoperable. Representatively, each security controller 24 may create user defined TCP/IP packets within the control module 40 without server intervention, which can be stored and/or transmitted.

The modular construction of the security controller 24 allows a facility operator to quickly and easily replace a security controller 24 without the need for downtime and/or expensive service calls. When a security controller 24 requires service, the facility operator simply dispatches a person (who need not necessarily be a trained technician) to the site with a replacement control module 40, which may be taken from a stock supply of identically constructed control modules 40. The person then simply removes the cover 32, disconnects the existing control module 40 and replaces it with a replacement control module 40, connects the cables 26*a*, 26*b*, 30*a*, 30*b* and 50 to the replacement control module 40, and reinstalls the cover 32. The control module 40 that has been replaced can then be returned for service. In the meantime, the replacement control module 40 communicates its presence in the system and is programmed, and is then used to operate the security control point according to the settings stored in the server for that security control point.

The system of the present invention provides a number of unique functions, features and capabilities. For example, and without limitation, the system may be used to monitor the current draw of a door lock or strike to diagnose its condition using a comparison to selected baseline values over a selected period of time. The system has the capability to notify the operator when point values of certain characteristics or parameters exceed programmed limits. Such events can be treated as alarm events. The system may also be used to monitor the total power consumption of a specific node including the devices which receive power from that node over a designated time period. By monitoring operating characteristics of equipment or devices interconnected with the node, variations beyond normal operating limits may be identified as events that can be managed as alarm events, which can be used to prompt a programmed response from the system and its operator. The system has the ability to monitor the voltage of designated input points to detect connection aging and other deterioration events for a selected time period. Information from such monitoring can be made available in trending formats with which the system can provide periodic evaluation of the monitored points for threshold adjustment, maintenance, resetting to the original condition values, or to replace the monitored equipment.

While the system has been shown and described respect to control via a CPU, it is contemplated that security controller 24 may incorporate a field programmable gate array (FPGA) system for configuring the controller 24 upon initial installation and/or replacement.

It should be understood that the invention is not limited in its application to the details of construction and arrangements of the components set forth herein. The invention is capable of other embodiments and of being practiced or carried out in various ways. Variations and modifications of the foregoing are within the scope of the present invention as defined in the appended claims. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A building control system comprising:

a building control server;

a plurality of local component controllers interconnected with the building control server, wherein each local component controller is configured to control a local component in a building; and a plurality of removable and replaceable local component control modules, each of which includes a processing unit;

wherein each local component controller comprises a mounting and access housing including a first housing portion secured to a portion of the building in a location within the building at which a local control function is carried out by the local component, wherein the first housing portion defines an interior, and wherein the mounting and access housing further includes an access cover configured for engagement with the first housing portion and movable between an open position for providing access to the interior of the first housing portion and a closed position for preventing access to the interior of the first housing portion; and wherein one of the plurality of removable and replaceable local component control modules is configured to be contained within the interior of the mounting and access housing of each local component controller, wherein each removable and replaceable local component control module includes a control module housing configured to be removed from and positioned within the interior of the first housing portion of the mounting and access housing as a unit when the access cover is in the open position;

wherein the control module housing of the removable and replaceable local component control module includes one or more local control module inputs and outputs for conenction with one or more inputs and outputs located within the interior of the first portion of the mounting and access housing and interconnected with the local component for performing the local component control function, and wherein the control module housing of the removable and replaceable local component control module further includes one or more control system inputs and outputs configured for connection with one or more control system inputs and outputs interconnected with the building control server; and wherein upon initial installation of the local component control module within the interior of the first housing portion of the mounting and access housing, the processing unit of the local component control module establishes communication with the building control server through the control system inputs and outputs and is configured in response to inputs from the building control server to operate the local component in accordance with operating parameters for the local component stored in the building control server.

2. The building control system of claim 1, wherein each of the plurality of local component control modules is interchangeable with other local component control modules in the building control system.

3. The building control system of claim 1, wherein each mounting and access housing is mounted to a wall of the building, and wherein the one or more local component inputs and outputs and the one or more building control server inputs and outputs are provided on cables that are located within the wall and that extend from the wall into the interior defined by the first housing portion, wherein the cables comprise one or more local component control cables that extend between the local component and the local component control module, and one or more building control system cables that extend between the building control server and the local component control module.

4. The building control system of claim 3, wherein the one or more building control server inputs and outputs connect the local component control module in a communication system interconnected with the building control server and the one or more local component inputs and outputs receive inputs from and provide outputs to the local component from the local component control module.

5. The building control system of claim 4, wherein each local component control module further includes a third connector for receiving inputs from or providing outputs to an auxiliary device other than the local component.

6. The building control system of claim 1, wherein the local component and the local component controller are configured and arranged such that, when communication between the building control server and the local component control module is interrupted, the local component control module continues to operate the local component in accordance with parameters configured in the local component control module by the building control server prior to communication between the building control server and the local component control module being interrupted.

7. The building control system of claim 1, wherein the local component control modules of the local component controllers are configured such that, when communication between the building control server and the local component control modules is interrupted, the local component control modules continue to communicate with each other for controlling the local components in accordance with operating parameters configured in the local component control modules by the building control server prior to communication between the building control server and the local component control modules being interrupted.

8. A method of installing and servicing a building control system that includes a building control server and a plurality of local component controllers, wherein each local component controller is configured to perform a local component control function in a building, comprising the acts of providing a mounting and access housing including a first housing portion secured to a portion of the building in a location within the building at which a local component control function is carried out, wherein the first housing portion defines an interior, and wherein the mounting and access housing further includes an access cover configured for engagement with the first housing portion and movable between an open position for providing access to the interior of the first housing portion and a closed position for preventing access to the interior of the first housing portion; and providing the local component controller by providing a plurality of removable and replaceable local component control modules, each of which includes a control module housing and a processing unit, and positioning one of the local component control modules within the interior of the mounting and access housing, wherein the control module housing of the removable and replaceable local component control module is configured to be removed from and positioned within the interior of the first portion of the mounting and access housing as a unit when the access cover is in the open position;

wherein the control module housing includes one or more local inputs and outputs interconnected with the processing unit and one or more building control system inputs and outputs interconnected with the processing unit;

connecting the local component control module in the building control system by positioning the control module housing as a unit within the interior of the first housing portion of the mounting and access housing; connection the local inputs and outputs with one or more inputs and outputs located within the interior of the mounting and access housing that are associated with one or more local building component inputs and outputs for performing the local component control function; connecting the one or more building control system inputs and outputs with one or more inputs and outputs located within the interior of the mounting and access housing that are associated with one or more building control inputs and outputs interconnected with the server; and subsequently configuring local component control parameters in the processing unit of the control module housing in response to inputs from the server; and when it is desired to remove the local building component control module from the building control system, the control module housing is removed as a unit from the interior of the first housing portion of the mounting and access housing and the local inputs and outputs are disconnected from the one or more inputs and outputs located within the interior of the mounting and access housing that are interconnected with one or more local building component inputs and outputs, and the one or more building control system inputs and outputs are disconnected from the one or more inputs and outputs located within the interior of the mounting and access housing that are associated with the one or more building control system inputs and outputs interconnected with the server.

9. The method of claim 8, further comprising the step of interchanging a first one of the plurality of local building component control modules with another one of the plurality of local building component control modules in the building control system.

10. The method of claim 8, wherein each mounting and access housing is mounted to a wall of the building, and wherein the one or more local building component inputs and outputs and the one or more building control system inputs and outputs are provided on cables that are located within the wall and that extend from the wall into the interior defined by the first housing portion, wherein the cables comprise one or more local component cables that extend between a local building component and the local component control module, and one or more building control system cables that extend between the building control server and the local component control module.

11. The method of claim 10, including the acts of connecting the one or more building control system inputs and outputs with the local component control module in a communication system interconnected with the building control server, and receiving inputs from and providing outputs to the local component from the local component control module.

12. The method of claim 11, further comprising receiving inputs from or providing outputs to an auxiliary device other than the local component via the local component control module.

13. The method of claim 8, wherein when communication between the building control server and the local component control module is interrupted, the local component control module continues carry out the local component control function in accordance with parameters configured in the local component control module by the building control server prior to communication between the building control server and the local component control module being interrupted.

14. The method of claim 8, wherein when communication between the building control server and the local component control modules is interrupted, the local component control modules continue to communicate with each other for carrying out the local control functions in accordance with operating parameters configured in the local component control modules by the building control server prior to communication between the building control server and the local component control modules being interrupted.

* * * * *